Dec. 25, 1956  E. C. YOKEL  2,775,328
SLIP OPERATING CLUTCH AND COOLING MEANS THEREFOR
Filed Nov. 17, 1953  7 Sheets-Sheet 4

Inventor
Edward C. Yokel.
By
Attorney.

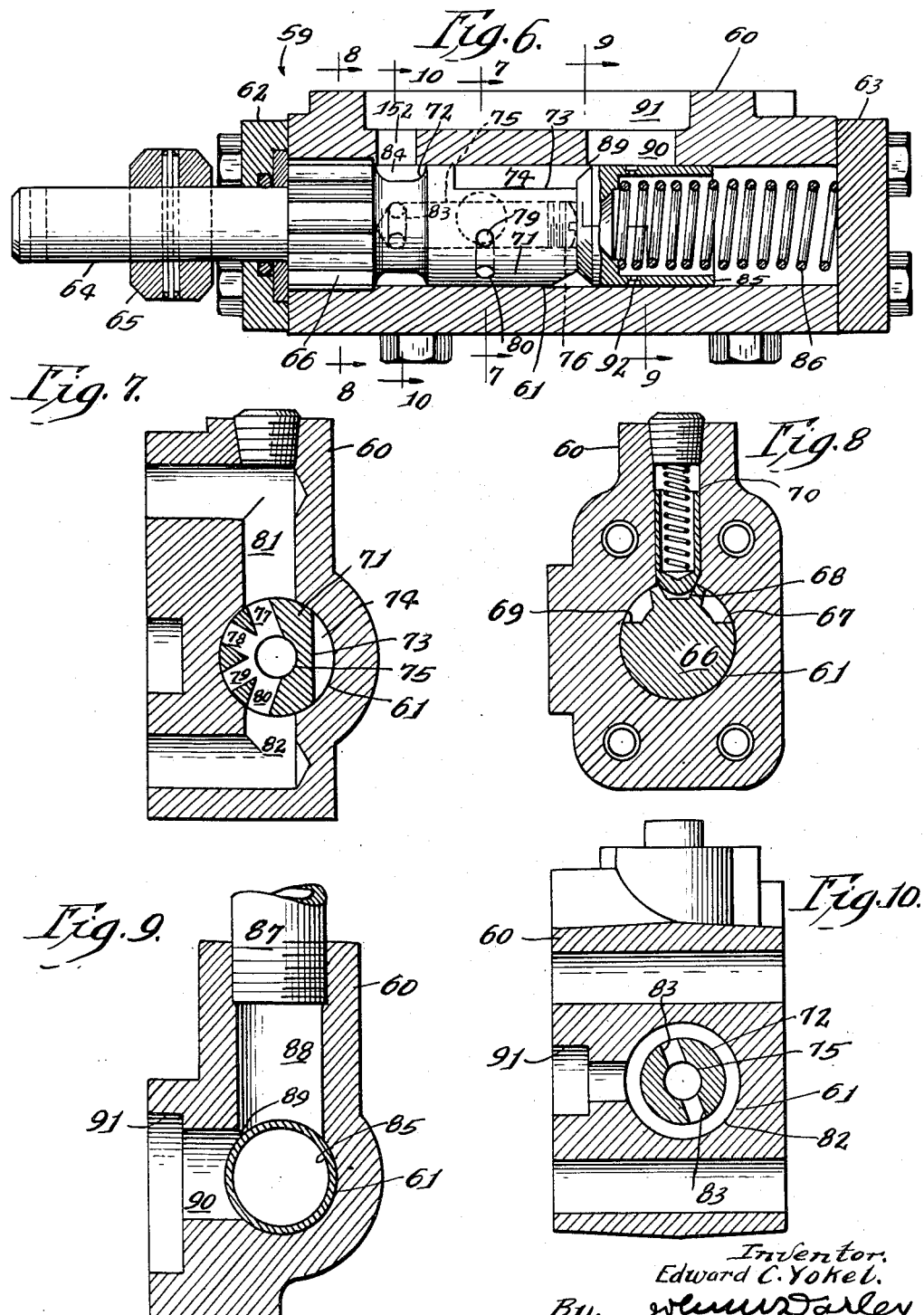

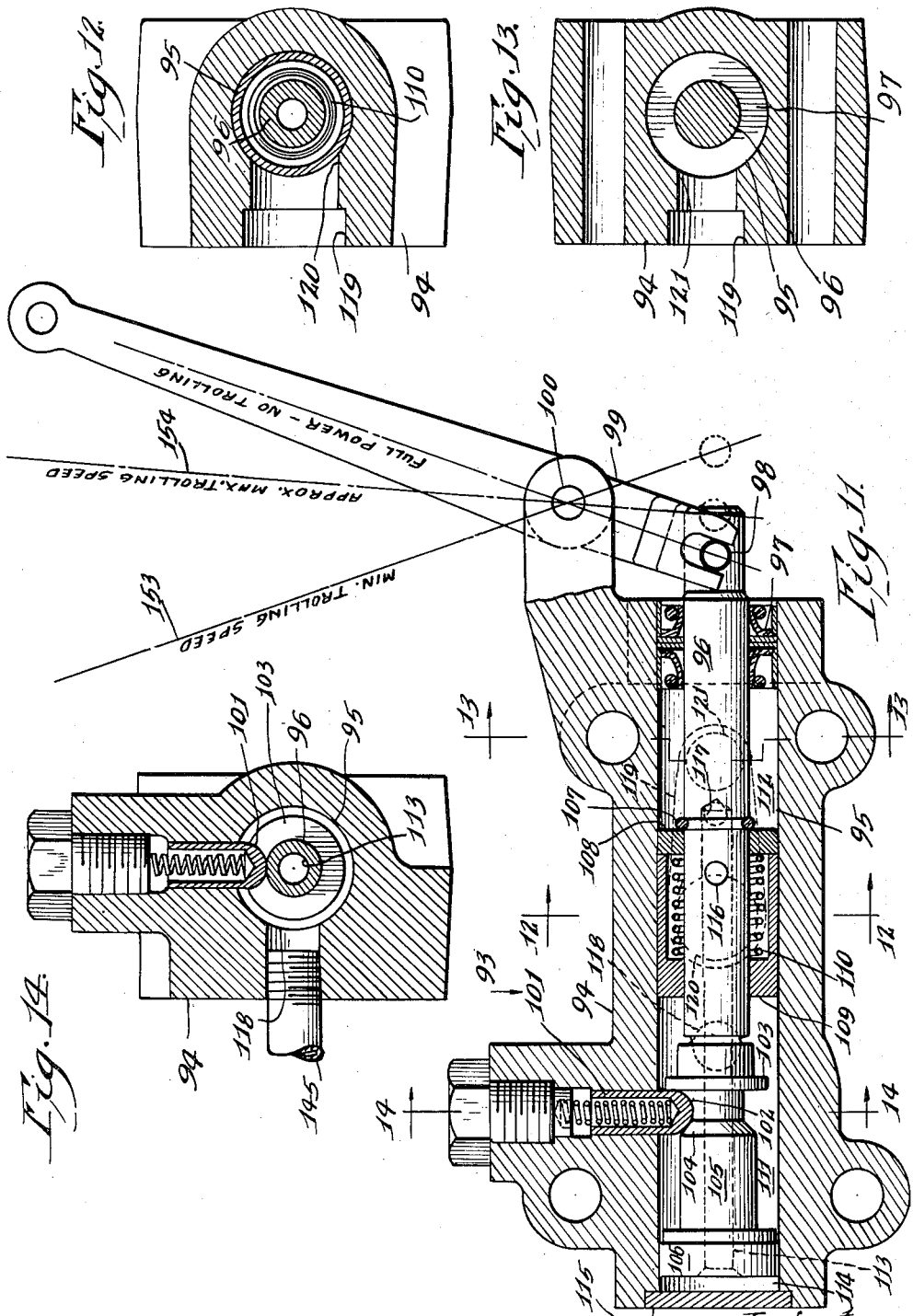

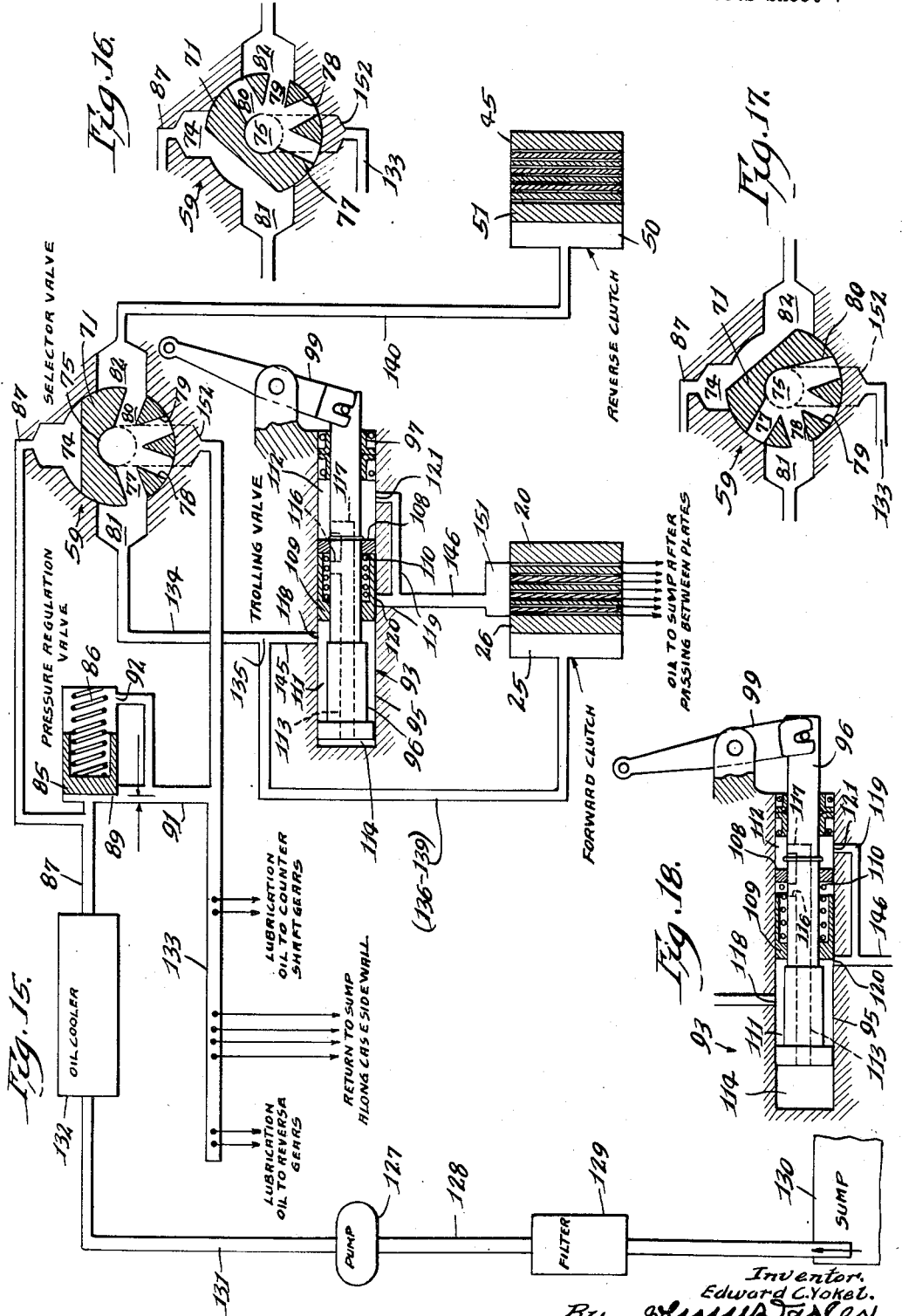

United States Patent Office 2,775,328
Patented Dec. 25, 1956

2,775,328

SLIP OPERATING CLUTCH AND COOLING MEANS THEREFOR

Edward C. Yokel, Racine, Wis., assignor to Twin Disc Clutch Company, Racine, Wis., a corporation of Wisconsin Application November 17, 1953, Serial No. 392,548

7 Claims. (Cl. 192—57)

My invention relates to marine gears and more particularly to a transmission of this type which is selectively conditioned to provide forward and reverse drives to the propeller shaft of a vessel in conjunction with establishing a trolling speed thereof during forward drive.

This gear is primarily intended for use on vessels which are required to operate at reduced speed for considerable periods. It is important, under these conditions and for the most efficient operation, that the engine shall run at a speed that will insure generator charging of the batteries, an absence of engine fouling and a freedom from roughness. The latter factor applies particularly to diesel engines. A characteristic use of the marine gear is on commercial fishing vessels which must operate at so-called trolling speeds for sustained periods, which speeds are materially below the normal or rated propeller speed of the vessel, and it eliminates any necessity for a multispeed transmission such as a two or three speed gear box.

It is therefore one object of the invention to provide a marine gear having forward and reverse, friction clutches which are selectively actuated for corresponding drives and in which the plates of the forward clutch may be conditioned to transmit a reduced or trolling speed to the propeller shaft of the vessel.

A further object is to provide a marine gear of the character indicated in which the clutches are hydraulically actuated and the slippage of the forward clutch is determined by instrumentalities forming part of a hydraulic system including both clutches.

A further object is to devise a marine gear as above in which the selector valve for determining the engagement of either clutch is linked in a hydraulic system which includes a trolling valve whose opening bleeds pressure from the supply to the forward clutch when engaged sufficient to establish a controlled slipping engagement thereof.

A further object is the use of the trolling valve to direct the diverted oil to the slipping clutch plate of the forward clutch for cooling and the transmission of torque by oil drag between the plates.

A further object is to provide a marine gear as above set forth in which the selector valve includes as an integral part thereof a pressure regulating valve for determining pressure to either clutch.

These and further objects of the invention will be set forth in the following specification, reference being had to the accompanying drawings, and the novel means by which said objects are effectuated will be definitely pointed out in the claims.

In the drawings:

Figs. 1 and 2 are sections along the lines 1—1 and 2—2 in Fig. 3 showing the forward and reverse drives of the marine gear, all respectively, the clutches being in neutral position and the selector and trolling valves being omitted.

Fig. 6 is an enlarged section of the selector valve in neutral position along the line 6—6 in Fig. 3.

Figs. 7 to 10 are sections along the lines 7—7, 8—8, 9—9 and 10—10, respectively, in Fig. 6, but with the selector valve viewed as it appears in Fig. 3.

Fig. 11 is an enlarged, vertical section of the trolling valve in full power, or non-trolling, position as viewed in Fig. 3.

Figs. 12, 13 and 14 are sections along the lines 12—12, 13—13 and 14—14, respectively, in Fig. 11.

Fig. 15 is a schematic layout, partly in section, of the hydraulic system for controlling the operation of the marine gear, the selector valve being shown in neutral position and the trolling valve in non-trolling position.

Figs. 16 and 17 are schematic views, partly in section, of the selector valve as it appears in Fig. 15 and showing positions thereof for determining forward and reverse drives, respectively, of the gear.

Fig. 18 is a schematic view of the trolling valve in a position determining minimum trolling speed.

Generally speaking, the marine gear includes a pair of gear trains through which power is selectively transmitted to provide either forward or reverse drive under the control of a selector valve forming part of a hydraulic system including a hydraulically actuated, friction clutch for each drive whose engagement completes the connection between the power source and the load. Included in the forward drive, hydraulic circuit is a trolling valve whose relation to the selector valve is such that, when open, the engaging pressure on the forward clutch is reduced to an extent permitting controlled slippage of the clutch plates and the attainment of a vessel speed less than the normal speed when the forward clutch is fully engaged.

Figure 1:
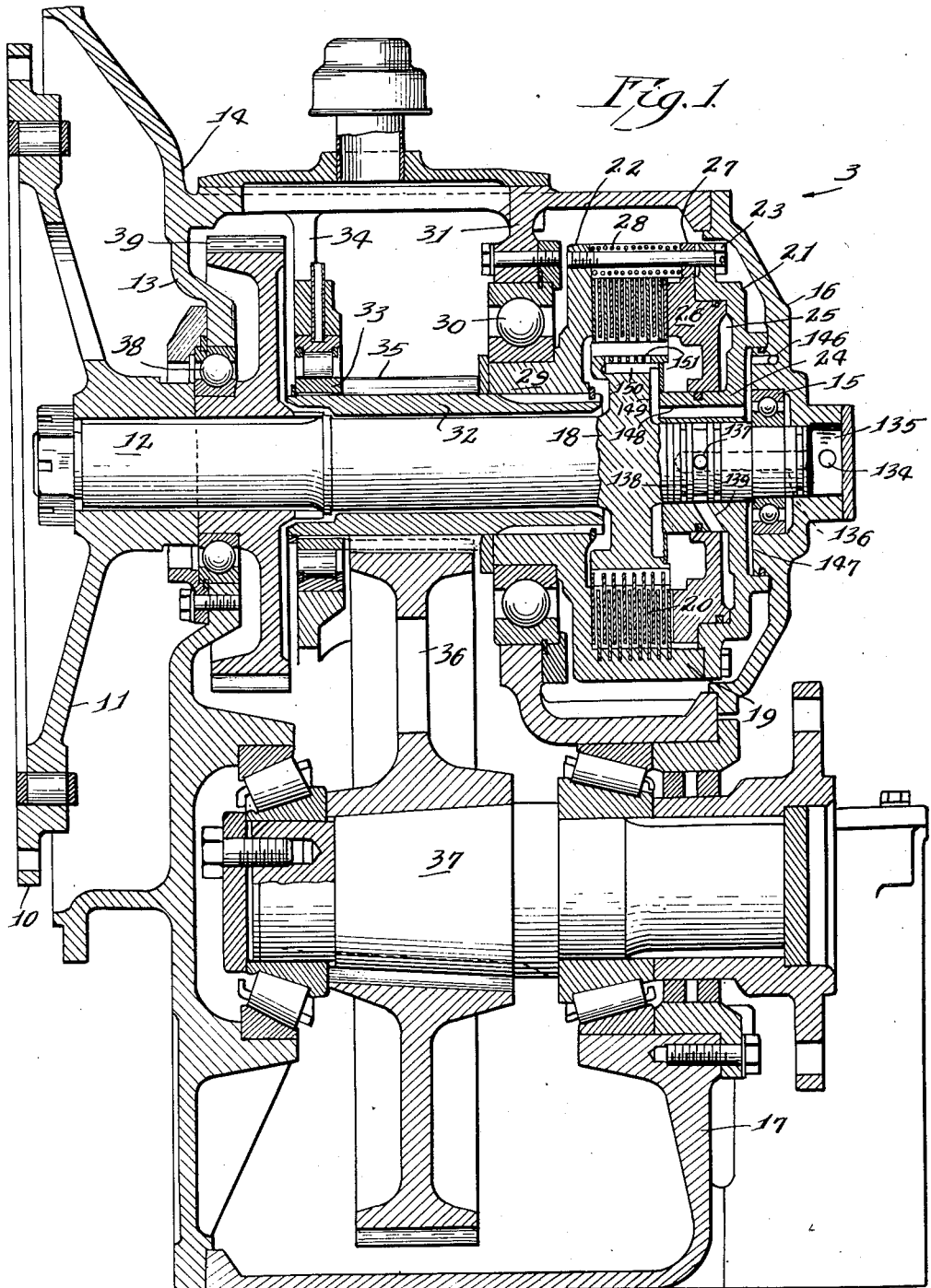

Referring to Fig. 1, the numeral 10 designates an internally toothed ring which is appropriately attached to a driving member (not shown), such as the flywheel of the vessel's power plant, and which meshes with a peripherally toothed spider 11 whose hub is keyed to an input shaft 12. This shaft extends through an end wall 13 which closes the forward end of a gear housing 14 and the right end of the shaft is journaled in a bearing 15 carried by a cover manifold 16 that is secured to the rear end of the gear housing.

At a convenient distance from the bearing 15 and inwardly of the housing 14, the shaft 12 includes an annulus 18 whose periphery is suitably toothed for relative axial sliding and driving engagement with a first plurality of clutch plates which are alternately related to a second plurality of clutch plates whose peripheries have driving and sliding engagement with a plurality of circumferentially spaced, cantilever arms 19. These clutch plates constitute part of a forward drive clutch 20 and the arms 19 extend between a back plate 21 and an abutment plate 22 with which the arms are integrally formed and this subassembly is secured together by a plurality of circumferentially spaced bolts 23. The back plate 21 includes a hub 24 that encircles the input shaft 12 between the bearing 15 and the annulus 18, and is otherwise suitably shaped on the clutch plate side to form an annular chamber 25 whose inner circumferential surface is defined by the hub 24.

An annular piston 26 is slidable in the chamber 25 in actuating relation to the plates of the forward drive clutch 20 and its periphery includes a plurality of lugs 27 which are slidable on the bolts 23 so that the piston 26 rotates with the clutch 20 when engaged. A helical spring 28 encircles each bolt 23 between the abutment plate 22 and the associated lug 27 and these springs act to shift the piston to the release position shown in Fig. 1 when the actuating pressure is interrupted.

The abutment plate 22, against which the plates of the clutch 20 are engaged, includes a hub 29 that is externally journaled in a bearing 30 carried by a first internal wall 31 in the housing 14 and is internally splined for connection to the adjacent end of a sleeve 32 that coaxially encircles and is spaced from the input shaft 32. The opposite end of the sleeve 32 is journaled in a bearing 33 carried by a second, internal wall 34. Between the bearings 30 and 33, the sleeve 32 includes a pinion 35 which meshes with a gear 36 that is keyed to an output shaft 37 suitably journaled in the end walls 13 and 17 and which projects outwardly of the latter for connection to a propeller shaft (not shown). From the foregoing, it will be understood that, when the clutch 20 is engaged, power is transmitted from the input shaft 12 to the clutch and thence through the pinion 35 and gear 36 to the output shaft 37 to provide forward drive.

Also splined to the input shaft 12 and journaled in a bearing 38 carried by the wall 13 is a pinion 39 which always rotates with the input shaft and provides a means for transmitting power to a countershaft forming part of the reverse drive as will now be described.

Figure 2:
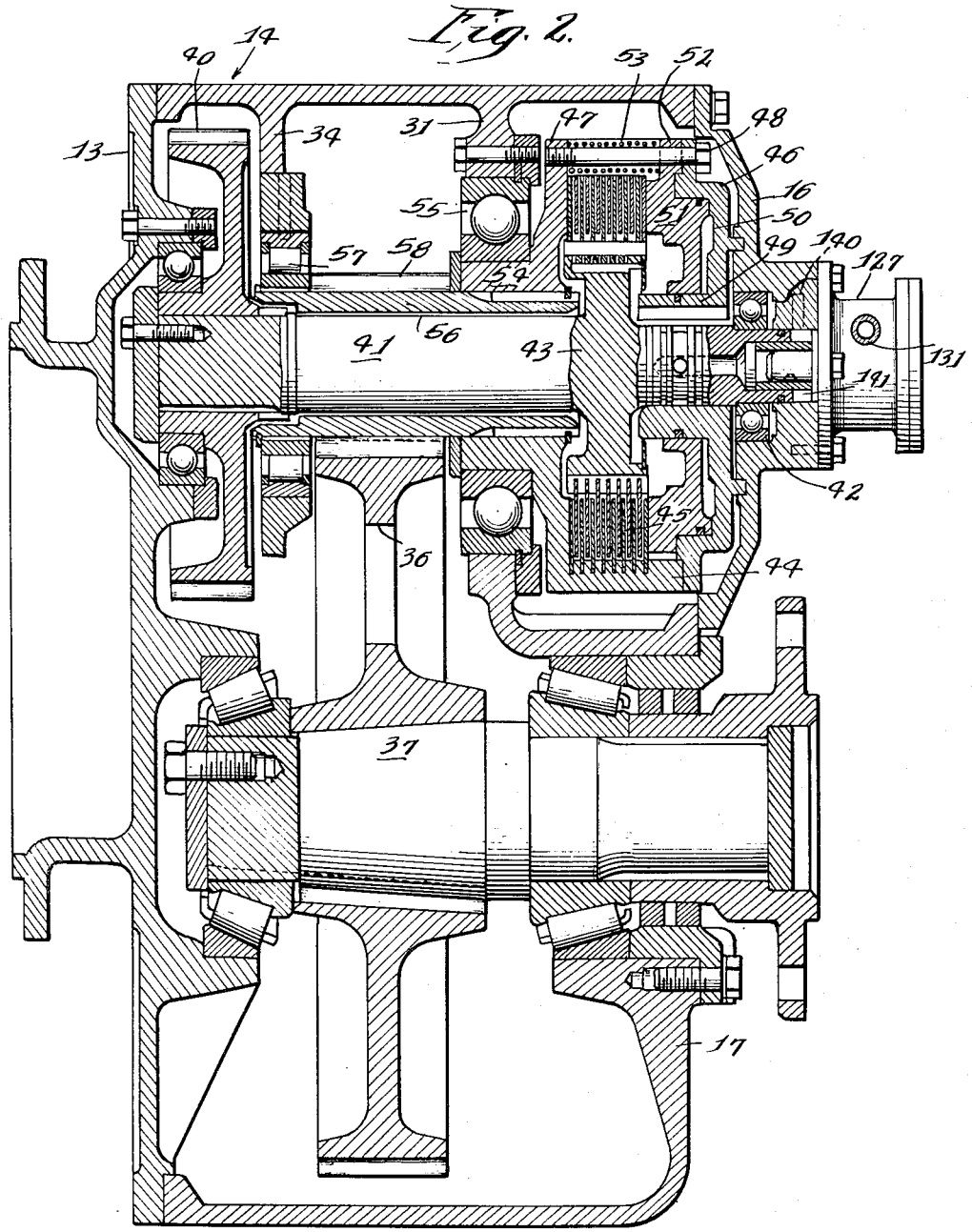
Figure 3:
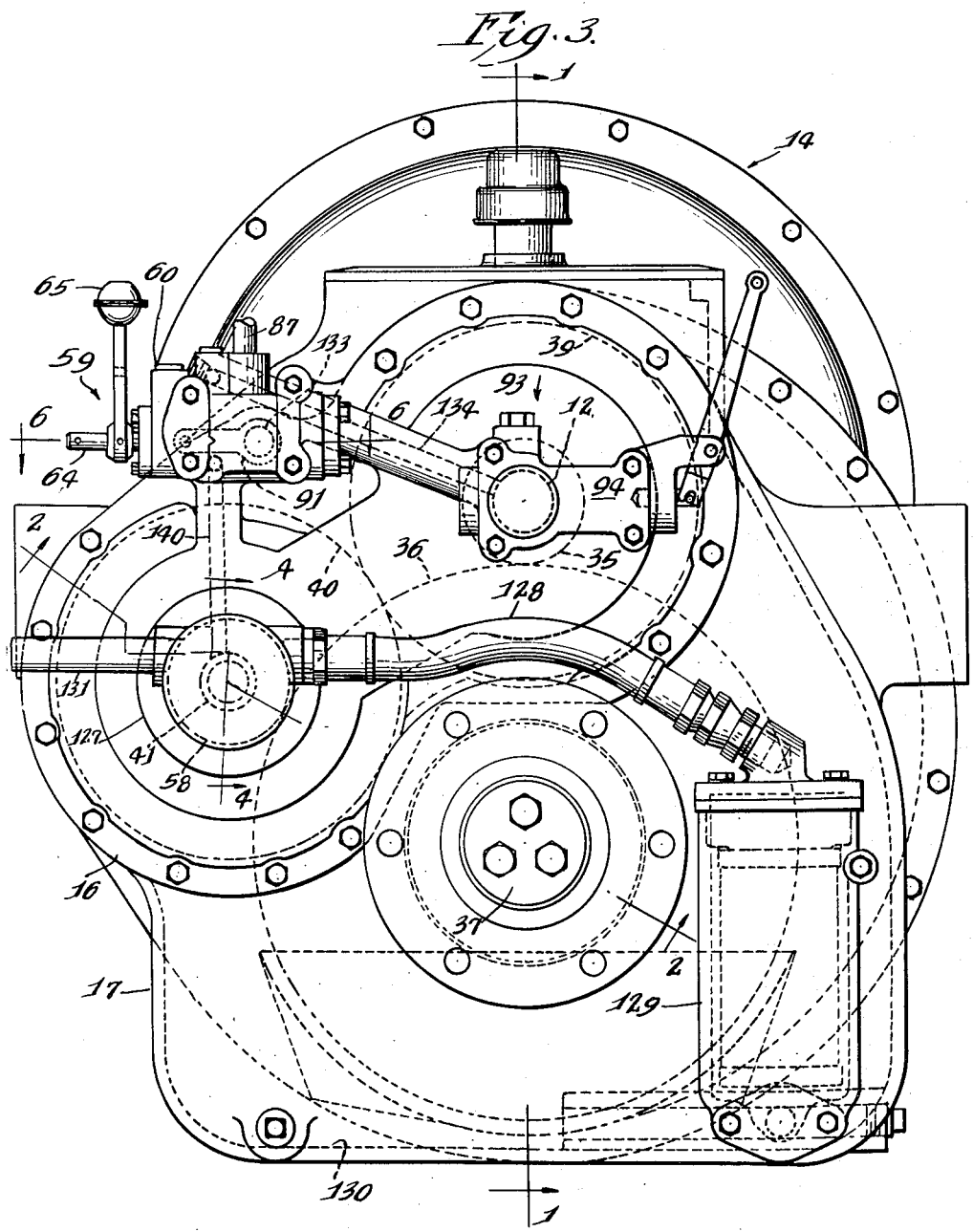
Fig. 3 is an end view of the gear in reduced scale looking in the direction of the arrow 3 in Fig. 1 and showing the location of the selector and trolling valves and the oil pump.

Referring to Figs. 2 and 3, the pinion 39 meshes with a gear 40 which is appropriately journaled in the end wall 13 and is splinedly connected to the adjacent end of a countershaft 41 which extends longitudinally of the housing 14 parallel to the input shaft 12 and the output shaft 37 and has its opposite end journaled in a bearing 42 carried by the cover manifold 16. An annulus 43, suitably spaced from the bearing 42, is formed on the shaft 41 and the periphery of this annulus is toothed for relative axial sliding and driving engagement with a first plurality of clutch plates which are alternately related to a second plurality of clutch plates whose peripheries have driving and sliding engagement with a plurality of circumferentially spaced, cantilever arms 44. This group of clutch plates constitute part of a reverse drive clutch 45.

The arms 44 extend between a back plate 46 and an abutment plate 47 with which the arms are integrally formed and this subassembly is secured together by a plurality of circumferentially spaced bolts 48. The back plate 46 includes a hub 49 that encircles the countershaft 41 between the bearing 42 and the annulus 43 and is shaped on the clutch plate side to form an annular chamber 50 whose inner circumferential surface is defined by the hub 49. An annular piston 51 is slidable in the chamber 50 in actuating relation to the plates of the reverse clutch 45 and its periphery includes a plurality of lugs 52 which are slidable on the bolts 48 so that the piston 51 rotates with the clutch 45 when engaged. A helical spring 53 encircles each bolt 48 between the abutment plate 47 and the associated lug 52 and these springs act to shift the piston 51 to the release position shown in Fig. 2 when the actuating pressure is cut off.

The abutment plate 47, against which the plates of the clutch 45 are engaged, includes a hub 54 that is externally journaled in a bearing 55 carried by the internal wall 31 and is internally splined for connection to the adjacent end of a sleeve 56 that coaxially encircles and is spaced from the countershaft 41. The opposite end of the sleeve 56 is journaled in a bearing 57 carried by the internal wall 34. Between the bearings 55 and 57, the sleeve 56 includes a pinion 58 that meshes with the gear 36. Hence, since the countershaft 41 always rotates when the engine is operating, reverse drive to the output shaft 37 is effected when the clutch 45 is engaged.

Selective actuation of the clutches 20 and 45 is determined by a selector valve 59 which is more particularly illustrated in Figs. 6 to 10, inclusive, and which is included in a hydraulic system presently described.

Referring to the last noted figures, the selector valve 59 includes a casing 60 which is attached to the cover manifold 16 as shown in Fig. 3. Extending lengthwise through the casing 60 is a cylindrical bore 61 whose opposite ends are closed by plates 62 and 63, respectively. Rockable in the bore 61 is a stem 64 which extends outward through the wall 62 for attachment to an actuating handle 65 and within the bore immediately adjacent the cover 62, the stem 64 includes a cylindrical portion 66 whose periphery is provided with circumferentially spaced notches 67, 68 and 69 (see Fig. 8) which are selectively engaged by a spring actuated pawl 70 to respectively determine forward drive, neutral and reverse drive as presently described more in detail.

The stem 64 also includes a cylindrical valve member 71 which is spaced from the portion 66 by a reduced neck 72 and a part of the periphery of the member 71 is flatted at 73 to define with the bore 61 a chamber 74 which extends from the right end of the member 71 to a point adjacent the neck 72. A passage 75 extends longitudinally of the stem 64 from the right or exposed end of the member 71 to a point within the neck 72 and the right end of this passage is closed by a plug 76.

Within the member 71, the passage 75 communicates with coplanar, radial passages 77, 78, 79 and 80 which fan out from this passage generally on one side of a diameter of the member 71 which is parallel to the flat 73 and terminate at the periphery of the valve member. As shown in Fig. 7, the passages 77 and 80 communicate at their outer ends with passages 81 and 82 in the casing 60 which lead to the forward and reverse clutches 20 and 45, all respectively, as presently described. Within the neck 72, the passage 75 connects through radial passages 83—83 with an annular chamber 84 defined by the neck and the surface of the bore 61.

Slidable in the bore 61 is a cup-shaped, pressure regulating valve 85 whose head is biased into contact with the right or exposed end of the valve member 71 by a spring 86 interposed between the end plate 63 and the head of the regulating valve. This position of the valve 85 is shown in Fig. 6 and is that occupied when the selector valve 59 is in the neutral position and the engine not running, or in the forward drive position when the vessel is trolling as presently explained. Hydraulic pressure is delivered to the top of the selector valve through a pipe 87 (see Figs. 3 and 9) which will be more particularly referred to in the description of the hydraulic circuit and which always communicates with the chamber 74 through a passage 88 in the casing 60 (see Fig. 9).

As shown by the location of the section line 9—9 in Fig. 6, the delivery end of the passage 88 is generally symmetrical with respect to the abutting faces of the valve member 71 and regulating valve 85 and is sufficiently large so that, in any rocked position of the selector valve 59, it always communicates with the chamber 74 which in turn may or may not connect with either of the passages 81 and 82 dependent upon position.

In the non-regulating position of the valve 85 as shown in Fig. 6, this valve uncovers a small port 89 through which low pressure oil may flow for lubrication as presently described to a port 90 and a banjo recess 91 in the gear housing side of the casing 60. The skirt of the regulating valve 85 preferably includes an annular series of ports 92 providing constant communication between the port 90 and the interior of the valve 85 to prevent trapping of oil behind this valve and insuring full regulating action of the spring 86.

For trolling operation of the vessel, there is provided a trolling valve 93 which coacts with the selector valve 59 when in forward drive position to establish a selected and controlled slippage of the plates of the forward clutch 20 and thereby secure any number of trolling speeds between determined maximum and minimum values.

The trolling valve 93 includes a casing 94 which is attached to the cover manifold 16 as shown in Fig. 3, but is more particularly illustrated in Figs. 11 to 13. Referring to Fig. 11 which shows the trolling valve in non-trolling position, or full power to the output shaft 37 when the forward clutch 20 is engaged, the casing 94 includes a bore 95 in which is reciprocable a stem 96. The latter extends outwardly through a seal 97 in the right end of the casing 94 and is provided with a transverse pin 98 for characteristic engagement with the bifurcated end of a trolling handle 99 that is intermediately pivoted at 100 on the casing 94. The stem 96 is held in the non-trolling position by means of a spring actuated pawl 101 whose rounded nose seats in an annular groove 102 defined by a stop ring 103 and an annular bevel 104 provided on the end of a cylindrical portion 105. Hence, movement of the stem 96 towards the left, as viewed in Fig. 11, is limited by the stop ring 103, but the stem may be easily moved in the opposite direction since the pawl 101 may ride outwardly when actuated by the bevel 104.

The left end of the stem 96 is slidably supported in the bore 95 by an annular boss 106 and, at a convenient distance from the seal 97, the stem carries a split ring 107 recessed therein which serves as a limiting stop for an abutment washer 108 slidable on the stem and within the bore 95. To the left of the washer 108, a hollow, floating piston 109 is also slidable in the bore 95 and a spring 110 is interposed between the washer and the head of the piston.

Except for the boss 106, the diameter of the stem 96 is substantially less than that of the bore 95 and defines therewith annular chambers 111 and 112, respectively, located between the boss 106 and the head of the piston 109, and between the washer 108 and the seal 97. An axial passage 113 extends from the left end of the stem 96 where it connects with a chamber 114 included in the bore 95 between the boss 106 and a closure disk 115 to just beyond the stop ring 107. Transverse passages 116 and 117 connect the passage 113 with the interior of the piston 109 and the chamber 112 for a purpose presently explained. When the selector valve 59 is in the forward drive position, pressure oil is available in the chamber 111 through a port 118 and while it acts against the floating piston 109, it is ineffective to shift the stem 96 towards the right as viewed in Fig. 11. On the cover manifold side of the casing 94, an elongated pocket 119 is recessed therein which at one end connects with the bore 95 through a port 120 in a position masked by the piston 109 when the trolling valve 93 is in non-trolling position, and at the other end connects with the same bore betwen the washer 108 and seal 97 through a port 121.

The hydraulic system which links the forward and reverse clutches, the selector and trolling valves will now be described.

Figures 4, 5:
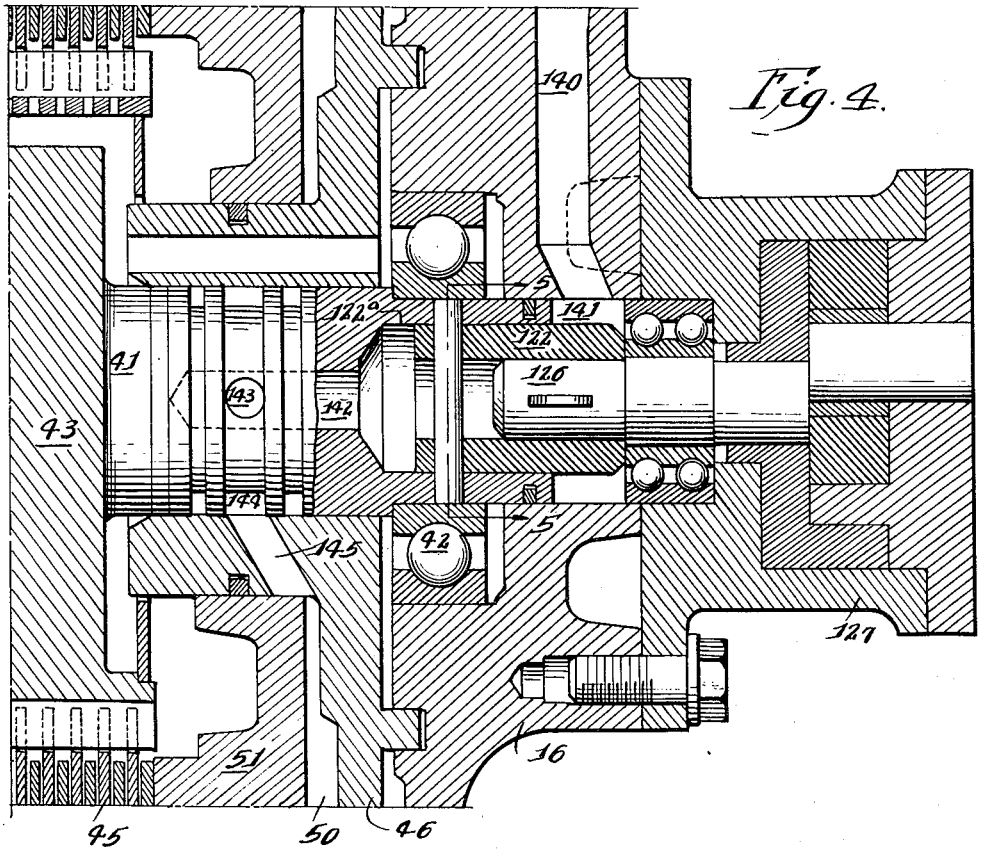
Fig. 4 is an enlarged detail section of the oil pump drive along the line 4—4 in Fig. 3.
Fig. 5 is a section along the line 5—5 in Fig. 4.

Referring first to Figs. 4 and 5, the right or clutch end of the countershaft 41 is counterbored at 122ᵃ to receive a sleeve 122 that is drivably secured thereto by a pin 123 and whose peripheral surface, as indicated in Fig. 5, is partially squared to provide a plurality of flat surfaces 124 each of which defines with the adjacent interior of the counterbore 122ᵃ a chamber 125 which extends for the length of the sleeve 122 for a purpose presently explained. Keyed to the interior of the sleeve 122 is a drive shaft 126 which extends through the cover manifold 16 for connection to a characteristic oil pump 127 that is attached to the manifold.

Referring to Fig. 3, the intake of the pump 127 connects through a pipe 128 and a filter 129 with a sump 130 constituted by the lower part of the gear housing 14 and, referring now to the schematic layout in Fig. 15, a pipe 131 connects the discharge side of the pump with one end of a cooler 132. For convenience in showing flow relations, the pressure regulating valve 85 and the selector valve member 71 are shown separated, but are actually mounted in the same casing 60 as shown in Fig. 6. As also shown in Figs. 3, 6 and 9, the cooler 132 delivers oil through the pipe 87 to the head of the regulating valve 85, then in non-regulating position if the pressure is sufficiently low so that it leaks oil through the port 89 to the banjo recess 91, shown as a pipe in Fig. 15, and also to the chamber 74 forming part of the selector valve 59. The ports 92 in Fig. 6 also connect with the bajo recess 91 to drain thereto oil which may collect behind the pressure regulating valve 85.

Oil from any source which is delivered to the recess 91 flows to a pipe 133 whose location is generally indicated in Fig. 3 and which extends within and lengthwise of the gear housing 14 and is suitably apertured as indicated in Fig. 15 for gear lubrication and return of the oil to the sump 130.

The passage 81 in the selector valve 59 (see Figs. 1, 3, 7 and 15) connects through a passage 134 in the cover manifold 16 with a chamber 135 (see Fig. 1) included in the manifold beyond the right end of the input shaft 12. The chamber 135 connects with the annular chamber 25 successively through an axial passage 136, radial passages 137 and an annular channel 138 in and around the same shaft, respectively, and a passage 139 in the hub 24, thus providing means for conducting pressure to the forward drive piston 26 when the selector valve member 71 is rocked counterclockwise in Fig. 15 to connect the chamber 74 with the passage 81.

The passage 82 in the selector valve 59 (see Figs. 2, 3, 4, 7 and 15) connects through a passage 140 in the cover manifold 16 with an annular chamber 141 (see Figs. 4 and 3) provided around the sleeve 122 at the right end of the countershaft 41. The chamber 141 connects through the chambers 125 around the sleeve 122 with a passage 142 coaxial with and constituting an extension of the counterbore 122ᵃ and the passage 142 in turn connects successively through a lateral passage 143 and an annular channel 144 in and around the countershaft 41, respectively, and a passage 145 with the annular chamber 50 to thereby provide passage means for conducting pressure to the reverse drive clutch 45 when the selector valve member 71 is rocked clockwise in Fig. 15 to connect the chamber 74 with the passage 82.

Referring to Figs. 11, 14 and 15, the inlet port 118 connects through a passage 145 shown in Figs. 14 and 15 with the chamber 135 leading to the forward drive clutch 20 and the ports 120 and 121 connect through the recess 119 with a passage 146 in the cover manifold 16 (see Fig. 1). The latter passage connects successively through an annular chamber 147 included between the back plate 21 and cover manifold 16, a plurality of passages 148 extending longitudinally through the hub 24, radial passages 149 along the adjacent side of the annulus 18, passages 150 extending transversely of this annulus, and a plurality of radial passages 151 extending from the passages 150 to the periphery of the annulus 18 which lies close to the interior edges of the plates of the forward drive clutch 20. Therefore, when the trolling valve 93 is opened as presently described, oil is tapped from the main supply passage 134 at the chamber 135 for discharge to the interior of the clutch and flow along the plate surfaces thereof.

In describing the operation of the marine gear, it will first be assumed that the trolling valve 93 is in non-trolling or closed position and that the selector valve 59 is in neutral position, all as shown in Fig. 15. Assuming idling operation of the engine, the pressure regulating valve 85 is then in a position slightly displaced to the right from that shown in Fig. 6. All discharge of the pump 127 flows through the port 89 to the perforated pipe 133 and thence to the sump 130 since the chamber 74 is then in non-communicating relation to either of the passages 81 and 82. At the same time, the annular chamber 25 in the forward clutch 20 connects through the passages 134, 81, 77, 75 and 83 (see Figs. 6, 10 and 15) with the annular chamber 84 and thence through a port 152 to the recess 91 and the perforated pipe 133. The forward drive chamber 25 is thus connected to the sump and the forward drive clutch 20 is released under the impulse of the springs 28. In comparable manner, the annular chamber 50 in the reverse clutch 45 connects through the passages 140, 82, 80, 75 and 83 and thence through the parts noted above to the pipe 133 so that the reverse clutch 45 is also disengaged.

To establish forward drive, the selector valve 59 is rocked counterclockwise as viewed in Fig. 15 to the position shown in Fig. 16 and the engine is accelerated to take up the load. The chamber 74 then connects with the passage 81 and pressure is established through the passage 134 to shift the piston 26 to engage the forward clutch 20. Oil continues to flow through the pipe 133 for lubrication and return to the sump. The reverse clutch 45 remains disengaged since its chamber 50 communicates with the sump through the passages listed above except that the passage 79 takes the place of the passage 80 due to the rotation of the member 71 (see Fig. 16).

On the other hand, if reverse drive is desired from the neutral position shown, the selector valve 59 is rocked clockwise as viewed in Fig. 15 to the position shown in Fig. 17. The chamber 74 then connects with the passage 82 and pressure is established through the passage 140 to shift the piston 51 to engage the reverse clutch 45 under the regulating action of the valve 85. Oil also flows through the pipe 133 for lubrication and return to the sump. The forward clutch 20 remains disengaged since its chamber 25 communicates with the sump through the passages listed above except that the passage 78 takes the place of the passage 77 due to the rotation of the member 71 (see Fig. 17).

An important feature of the invention is the operation of the trolling valve which enables the forward clutch 20 to be conditioned for a controlled slippage transmission of power while maintaining the plates of this clutch relatively cool.

When the vessel reaches the fishing area and it is desired to reduce to some trolling speed, the selector valve 59 is held in the forward drive position shown in Fig. 16 and the trolling valve handle 99 is rocked counterclockwise from the position shown in Figs. 11 and 15 to any selected position between the lines 153 and 154 in Fig. 11. These lines represent generally minimum and maximum trolling speed positions with additional speeds obtainable when the handle 99 occupies any position intermediate therebetween.

Assuming by way of example that minimum trolling speed is required, the handle 99 is rocked to the position shown in Fig. 18. Prior thereto, i. e., with the handle 99 in the non-trolling position shown in Fig. 15 and the selector valve 59 in the forward drive position shown in Fig. 16, pressure through the inlet port 118 holds the floating piston 109 against the abutment washer 108 and this position is maintained until the stem 96 has moved sufficiently to enable the piston 109 to uncover the outlet port 120. The spring 110 then elongates slightly and exercises a pressure regulating action on the oil in the chamber 111 and hence backward through the passage 145, chamber 135 and passages 136 to 139 on the oil pressure to the forward clutch 20 for controlled slipping thereof. This action will vary with the position of the handle 99 between its minimum and maximum trolling speed positions.

With the outlet port 120 open, the pressure regulating valve 85 no longer exercises regulating control on the pressure acting against the piston 26 of the forward clutch 20 and is moved by the spring 86 to contact the selector valve member 71 as shown in Fig. 6, except that the latter member occupies the rocked position shown in Fig. 16. Since the full engaging pressure to the clutch 20 is reduced when the trolling valve 93 opens, the clutch plates release slightly and begin to slip while still transmitting torque so that the speed of the output shaft 37 drops.

From the foregoing, it will be understood that the extent of slippage of the plates of the clutch 20 is controlled by the position of the trolling valve 93 in relation to the outlet port 120 since the degree of opening of the latter port determines the amount of pressure reduction on the forward clutch 20 and hence the extent to which the plates thereof are released by the springs 28. The flooding of the plates with oil not only maintains them in an operatively cool condition, but, in addition, the controlling of the plate "clearance" enables the use of the oil on the plates as a torque transmitter through oil drag or shear.

In all trolling positions of the trolling valve 93, the latter is free of hydraulic thrust and is substantially hydraulically balanced since the passages 113, 116 and 117 in the stem 96 substantially equalizes the pressure in all parts of the bore 95 including the chamber 114, the interior of the floating valve 109, and the portion of the bore between the washer 108 and the seal. Access of pressure to the noted parts of the bore 95 is by way of the outlet port 120 and the recess 119, shown as a bypass in Figs. 15 and 18. Therefore, the operator is not restricted to a limited number of detent positions in manipulating the trolling valve, but may select any one of an indefinite number between the limiting positions 153 and 154 and the handle 99 will remain in the selected position without requiring stops of any kind.

A particular advantage of the control is that, when trolling, the engine may be run at a speed high enough to prevent fouling and rough operation and to charge the batteries, vessels of this type being ordinarily equipped with power plants of the internal combustion type. This advantage is important in fishing vessels of the commercial type which operate at trolling speeds for sustained periods. In a characteristic unit, the speed of the engine when trolling may vary from 700 to 900 R. P. M., but the output shaft speed will vary from 88 to 200 R. P. M. when trolling with a 4:1 reduction in the gearing.

I claim:

1. In a marine gear, the combination of an input shaft, an output shaft, and an oil pressure system including an oil actuated, multiple plate clutch fully engageable to connect the shafts to provide a normal speed of the output shaft, means for bleeding actuating oil to determine a fixed slipping condition of the clutch and a selected less than normal speed of the output shaft and including means for regulating oil pressure on the slipping clutch, and means for directing the bled oil between the slipping clutch plates for cooling and the transmission of torque by oil drag.

2. In a marine gear, the combination of an input shaft, an output shaft, and an oil pressure system including an oil actuated, multiple plate clutch fully engageable to connect the shafts to provide a normal speed of the output shaft, a selector valve movable between positions determining full engagement and neutral of the clutch, a trolling valve operable to bleed from the system sufficient pressure oil to determine a fixed slipping condition of the clutch when the selector valve is in engaging position and thereby provide a selected speed of the output shaft less than that effected when the clutch is fully engaged and including means for regulating oil pressure on the slipping clutch, and means for directing the bled oil between the slipping clutch plates for cooling and the transmission of torque by oil drag.

3. In a marine gear, the combination of an input shaft, an output shaft, and an oil pressure system including an oil actuated, multiple plate clutch fully engageable to connect the shafts to provide a normal speed of the output shaft, a selector valve movable between positions determining full engagement and neutral of the clutch, a trolling valve positioned on the delivery side of the selector valve and operable to bleed from the system sufficient pressure oil to determine a fixed slipping condition of the clutch when the selector valve is in engaging position and thereby provide a selected speed of the output shaft less than that effected when the clutch is fully engaged and including means for regulating oil pressure on the slipping clutch, and means for directing the bled oil between the slipping clutch plates for cooling and the transmission of torque by oil drag.

4. In a marine gear, the combination of an input shaft, an output shaft, and an oil pressure system including an oil actuated, multiple plate clutch fully engageable to connect the shafts to provide a normal speed of the output shaft, a selector valve movable between positions determining full engagement and neutral of the clutch, a trolling valve located in parallel with a portion of the system leading from the selector valve to the clutch and operable to bleed from the system sufficient pressure oil to determine a fixed slipping condition of the clutch when the selector valve is in engaging position and thereby provide a selected speed of the output shaft less than that effected when the clutch is fully engaged and including means for regulating oil pressure on the slipping clutch, and means for directing the bled oil between the slipping clutch plates for cooling and the transmission of torque by oil drag.

5. In a marine gear, the combination of an input shaft, an output shaft, and an oil pressure system including an oil actuated, multiple plate clutch fully engageable to connect the shafts to provide a normal speed of the output shaft, a passage for transmitting oil pressure to the clutch, a selector valve in the passage movable between positions determining full engagement and neutral of the clutch, a trolling valve including a casing having an inlet port connected to the passage on the delivery side of the selector valve and an outlet port, a stem reciprocable in the casing, and a spring actuated, floating piston mounted on the stem in operable relation to the outlet port whereby oil is bled from the passage to determine a fixed slipping condition of the clutch under a pressure regulated by the piston when the selector valve is in engaging position and thereby provide a selected speed of the output shaft less than that effected when the clutch is fully engaged, and passage means for directing the bled oil between the slipping clutch plates for cooling and the transmission of torque by oil drag.

6. In a marine gear, the combination of an input shaft, an output shaft, and an oil pressure system including an oil actuated, multiple plate clutch fully engageable to connect the shafts to provide a normal speed of the output shaft, a passage for transmitting oil pressure to the clutch, a selector valve in the passage movable between positions determining full engagement and neutral of the clutch, a trolling valve including a casing having an inlet port connected to the passage on the delivery side of the selector valve and an outlet port, a stem reciprocable in the casing, and a spring actuated, floating piston mounted on the stem in operable relation to the outlet port whereby oil is bled from the passage to determine a fixed slipping condition of the clutch under a pressure regulated by the piston when the selector valve is in engaging position and thereby provide a selected speed of the output shaft less than that effected when the clutch is fully engaged, means for hydraulically balancing the stem and piston in all operating positions thereof, and passage means for directing the bled oil between the slipping clutch plates for cooling and the transmission of torque by oil drag.

7. In a marine gear, the combination of an input shaft, an output shaft, and an oil pressure system including an oil actuated, multiple plate clutch fully engageable to connect the shafts to provide a normal speed of the output shaft, a passage for transmitting oil pressure to the clutch, a selector valve in the passage movable between positions determining full engagement and neutral of the clutch and including means for regulating the oil pressure during full engagement, a trolling valve including a casing having an inlet port connected to the passage on the delivery side of the selector valve and an outlet port, a stem reciprocable in the casing, and a spring actuated, floating piston mounted on the stem in operable relation to the outlet port whereby oil is bled from the passage to determine a fixed slipping condition of the clutch under a pressure regulated by the piston when the selector valve is in engaging position and thereby provide a selected speed of the output shaft less than that effected when the clutch is fully engaged, and passage means for directing the bled oil between the slipping clutch plates for cooling and the transmission of torque by oil drag.

References Cited in the file of this patent

UNITED STATES PATENTS

| | | |
|---|---|---|
| 1,938,780 | Nenninger et al. | Dec. 12, 1933 |
| 2,099,422 | Farmer | Nov. 16, 1937 |
| 2,329,742 | Bush et al. | Sept. 21, 1943 |
| 2,632,544 | Hockert | Mar. 24, 1953 |
| 2,678,485 | Browne | May 18, 1954 |

FOREIGN PATENTS

| | | |
|---|---|---|
| 784,051 | France | Apr. 23, 1935 |